United States Patent
Yang et al.

(10) Patent No.: US 10,629,314 B2
(45) Date of Patent: Apr. 21, 2020

(54) NUCLEAR POWER PLANT CONTAINMENT COOLING SYSTEM AND SPRAY FLOW CONTROL METHOD THEREFOR

(71) Applicants: China Nuclear Power Technology Research Institute, Shenzhen, Guangdong (CN); China General Nuclear Power Corporation, Shenzhen, Guangdong (CN)

(72) Inventors: Jiang Yang, Guangdong (CN); Ting Wang, Guangdong (CN); Jun Tao, Guangdong (CN); Jun Cui, Guangdong (CN); Xianghui Lu, Guangdong (CN); Zhengfeng Shang, Guangdong (CN); Chengjun Zhuang, Guangdong (CN); Weiqing Lin, Guangdong (CN); Jianshu Lin, Guangdong (CN)

(73) Assignees: China Nuclear Power Technology Research Institute, Shenzhen (CN); China General Nuclear Power Corporation, Shenzhen (CN)

( * ) Notice: Subject to any disclaimer, the term of this patent is extended or adjusted under 35 U.S.C. 154(b) by 503 days.

(21) Appl. No.: 15/111,480

(22) PCT Filed: Jan. 13, 2014

(86) PCT No.: PCT/CN2014/070539
§ 371 (c)(1),
(2) Date: Jul. 13, 2016

(87) PCT Pub. No.: WO2015/103790
PCT Pub. Date: Jul. 16, 2015

(65) Prior Publication Data
US 2016/0372218 A1 Dec. 22, 2016

(51) Int. Cl.
*G21C 15/18* (2006.01)

(52) U.S. Cl.
CPC .............. *G21C 15/18* (2013.01); *Y02E 30/40* (2013.01)

(58) Field of Classification Search
CPC ........ G21C 15/12; G21C 15/18; G21C 15/00; G21C 15/182; G21C 17/035;
(Continued)

(56) References Cited

U.S. PATENT DOCUMENTS

| 5,049,353 A * | 9/1991 | Conway ................. G21C 15/18 376/293 |
| 5,339,340 A * | 8/1994 | Hunsbedt ............... G21C 15/18 376/299 |

(Continued)

FOREIGN PATENT DOCUMENTS

| CN | 201553601 U | 8/2010 |
| CN | 102081976 B | 10/2012 |

OTHER PUBLICATIONS

An English machine translation of Zheng et al., CN102081976(A), downloaded on espacenet.com on Nov. 7, 2018. (Year: 2011).*

(Continued)

*Primary Examiner* — Lily C Garner (57) ABSTRACT

A nuclear power plant containment cooling system and a spray flow control method therefor. The system comprises a cooling system liquid tank (2) for storing cooling liquid, wherein the cooling system liquid tank (2) is provided at the top of a containment (1) and the cooling liquid is used for cooling the containment (1) through the gravity of the cooling liquid itself in the situation of an accident, and the cooling liquid is partially evaporated. The nuclear power plant containment cooling system further comprises an adjustment mechanism; wherein the adjustment mechanism is provided at a liquid outlet of the cooling system liquid tank (2), and the adjustment mechanism is used for control- (Continued)

ling the flow at the liquid outlet according to buoyancy generated by a liquid level of the collected cooling liquid which is not evaporated.

8 Claims, 5 Drawing Sheets

(58) Field of Classification Search
CPC .... G01F 23/0038; G01F 23/162; F16K 31/15; F16K 31/22
See application file for complete search history.

(56) References Cited

U.S. PATENT DOCUMENTS

2013/0108004 A1\* 5/2013 Lee .................. G21C 19/07
376/299
2013/0223581 A1\* 8/2013 Katono .............. G21C 13/02
376/280

OTHER PUBLICATIONS

An English machine translation of Li, CN201553601(U), downloaded from espacenet.com on Nov. 7, 2018. (Year: 2010).\*
An English machine translation of Wang, CN2248327 (Y), downloaded from espacenet.com on Apr. 12, 2018. (Year: 1997).\*
International Search Report of PCT Patent Application No. PCT/CN2014/070539 dated Oct. 10, 2014.

\* cited by examiner

NUCLEAR POWER PLANT CONTAINMENT COOLING SYSTEM AND SPRAY FLOW CONTROL METHOD THEREFOR

TECHNICAL FIELD

The present application relates to a nuclear power plant containment cooling system therefor, and more particularly, relates to a passive nuclear power plant containment cooling system and a spray flow control method therefor.

BACKGROUND

A nuclear power plant usually uses a closed containment to contain reactors and several important safety systems, in order to prevent radioactive substances from leaking into the surrounding area in case an accident occurs in the nuclear power plant.

If the nuclear power plant uses a safety cooling system based on the passive concept and a flow control system based on the automatic control principle, not only engineered safety features can be simplified, but also operator interventions can be reduced, and thus misoperation that may be produced can be reduced, and man-machine relationship can be improved, thereby improving the safety of the nuclear power plant.

In an existing nuclear power system, in general, a cooling liquid storage tank is arranged on a top of the containment. When an accident occurs in the nuclear power plant, the storage tank provides water source, and the water is sprayed onto an outer wall of the containment to form water film. In this way, the heat of and inside the shell of the containment is conducted out by evaporation of the water film and air convection, and an internal pressure inside the containment is reduced by cooling, thereby ensuring that the containment will not be damaged due to too high pressure.

However, the above design has the following technical problems: when the water film has not been completely evaporated, the water in the storage tank of the cooling system will continuously flow downwardly, then reach to a bottom of the containment, and finally be directly discharged, which cause a waste of the cooling liquid. Meanwhile, in order to ensure that the containment is sufficiently cooled, a cooling liquid storage tank having a relative large capacity (a relative heavy weight) is generally provided at the top of the containment, and the mounting and maintenance thereof are inconvenient. It is likely for the structure of the cooling liquid storage tank to be damaged and for the safety function thereof to be disabled in case of coming across extreme events such as earthquake, tsunami, tornado and the like.

Meanwhile, in the existing design, there is no control for the spray flow of the cooling liquid storage tank, or a temperature of the containment is monitored by a sensor and a corresponding control unit is provided to give instructions to control the flow of the cooling liquid inside the cooling liquid storage tank. For the former one, if the flow is too large, lots of the cooling liquid is wasted since the cooling liquid can not be made the best use of. For the later one, the operations for monitoring the temperature of the containment and controlling the flow of the cooling liquid need a support of the power source, which makes a design of the structure of the hardware more complicated; besides, when a lots of accidents occur, it is possible for the power source to be failed, and thus the cooling design described above cannot work normally.

BRIEF SUMMARY

The objective of the present application is to provide a nuclear power plant containment cooling system and spray flow control method therefor, aiming at the drawbacks in the prior art that, it has a low safety, a complicated structure and is not conducive to. The system and method of the present application can passively and automatically adjust the flow of the cooling liquid.

In accordance with one aspect of the present application, a nuclear power plant containment-rod cooling system is provided, which comprises:

a cooling system liquid tank for storing cooling liquid, wherein the cooling system liquid tank is arranged at a top of a containment; the cooling liquid is used for cooling the containment through the gravity of the cooling liquid in the situation of an accident, and the cooling liquid is partially evaporated;

the nuclear power plant containment cooling system further comprises an adjustment mechanism; wherein the adjustment mechanism is arranged at a liquid outlet of the cooling system liquid tank; the adjustment mechanism is used for controlling the flow at the liquid outlet according to buoyancy generated by a liquid level of the collected cooling liquid which is not evaporated.

The nuclear power plant containment cooling system further includes a heat transfer liquid pool which is arranged at a bottom on an outside of the containment and which is used for collecting the cooling liquid which is not evaporated; one end of the adjustment mechanism is suspended above a liquid level of the heat transfer liquid pool, while the other end of the adjustment mechanism is connected to the liquid outlet.

In the nuclear power plant containment cooling system of the present application, wherein the nuclear power plant containment cooling system further includes:

a spraying device communicated with the cooling system liquid tank; the cooling liquid flows out of the liquid outlet to the spraying device, and is further sprayed onto the outside of the containment by the spraying device to form a liquid film covering the containment;

the spraying device includes a spraying valve which is associated with the adjustment mechanism; the adjustment mechanism adjusts an opening degree of the spraying valve according to the buoyancy generated by the heat transfer liquid pool to further control the flow at the liquid outlet.

In the nuclear power plant containment cooling system of the present application, wherein the adjustment mechanism includes:

a connecting-rod transmission mechanism and a buoyancy supporting element connected to one end of the connecting-rod transmission mechanism that is close to the heat transfer liquid pool;

one end of the connecting-rod transmission mechanism that is away from the buoyancy supporting element is connected to the spraying valve;

when an evaporating amount of the cooling liquid in the heat transfer liquid pool is larger than the flow at the liquid outlet, the liquid level of the heat transfer liquid pool drops, the buoyancy supporting element drives the connecting-rod transmission mechanism to move downwardly along with the dropping of the liquid level of the heat transfer liquid pool, the opening degree of the spraying valve increases, and the flow at the liquid outlet increases;

when the evaporating amount of the cooling liquid in the heat transfer liquid pool is less than the flow at the liquid outlet, the liquid level of the heat transfer liquid pool rises, the buoyancy supporting element drives the connecting-rod transmission mechanism to move upwardly along with the rising of the liquid level of the heat transfer liquid pool, the opening degree of the spraying valve decreases, and the flow at the liquid outlet decreases.

In the nuclear power plant containment cooling system of the present application, wherein the system further includes a shielding shell; the shielding shell is sleeved on a periphery of the containment, and the heat transfer liquid pool for receiving the cooling liquid and a circulating space for air circulation are formed.

In the nuclear power plant containment cooling system of the present application, wherein a thermal insulation baffle is vertically arranged in the heat transfer liquid pool; the thermal insulation baffle is located below the buoyancy supporting element; the thermal insulation baffle is used for dividing the heat transfer liquid pool into an inner corridor which is close to the containment and an outer corridor which is close to the shielding shell; the inner corridor and the outer corridor are communicated with each other at a bottom of the thermal insulation baffle; a heat cycling space for heat transfer is formed between the inner corridor and the outer corridor.

In the nuclear power plant containment cooling system of the present application, wherein an air inlet is defined on a side wall of the shielding shell; a position of the air inlet is higher than a highest freely floating position of the buoyancy supporting element; the air enters the heat cycling space, mixes with the air in the circulating space, and further flows upwardly along with the steam evaporated from the outer wall of the containment.

In the nuclear power plant containment cooling system of the present application, wherein an air outlet is further defined at a top of the shielding shell; the air inlet, the circulating space and the air outlet together form a steam circulating channel.

In the nuclear power plant containment cooling system of the present application, wherein the spraying device includes a spraying pipeline and a cooling liquid dispersion device communicated with the spraying pipeline; one end of the spraying pipeline is communicated with the cooling system liquid tank, and the other end of the spraying pipeline is communicated with the cooling liquid dispersion device; the spraying valve is mounted on the spraying pipeline; a spraying opening is defined on the cooling liquid dispersion device; the cooling liquid flows into the spraying pipeline via the cooling system liquid tank, and is controlled by the spraying valve to flow into the cooling liquid dispersion device; the cooling liquid is further sprayed to the outside of the containment.

In the nuclear power plant containment cooling system of the present application, wherein a plurality of adjustment mechanisms are provided; the plurality of adjustment mechanisms are evenly distributed on the outside of the containment; each of the adjustment mechanisms corresponds to one spraying valve.

In the nuclear power plant containment cooling system of the present application, the buoyancy supporting element is a floater.

In the nuclear power plant containment cooling system of the present application, wherein the thermal insulation baffle is used for insulating the heat of the flow in the inner corridor from the heat of flow in the outer corridor in the heat transfer liquid pool.

Furthermore, a spray flow control method of a nuclear power plant containment cooling system is further provided, which comprises the following steps:

S1, in the situation of an accident, initiating the cooling system, cooling liquid flowing to a containment via a liquid outlet in form of a maximal flow due to the gravity, thereby cooling the containment; the cooling liquid being partially evaporated during the cooling process; and S2, adjusting the flow at the liquid outlet according to buoyancy generated by a liquid level of the collected cooling liquid which is not evaporated.

In the spray flow control method of a nuclear power plant containment cooling system, wherein
before the step S1, the method further includes step:

S0, presetting an initial liquid level of a heat transfer liquid pool before initiating the cooling system, making a lower end of an adjustment mechanism suspended above the initial liquid level of the heat transfer liquid pool.

In the spray flow control method of a nuclear power plant containment cooling system, wherein the step S1 further includes:

after the cooling system is initiated and before a liquid level of the heat transfer liquid pool is in contact with one end of the adjustment mechanism, the spraying valve has the largest opening degree; the cooling liquid flows to an outside of the containment via the liquid outlet of a cooling system liquid tank in form of a maximal flow to form liquid film covering the containment;

after the liquid level of the heat transfer liquid pool rises to be in contact with one end of the adjustment mechanism, the adjustment mechanism controls the flow at the liquid outlet according to buoyancy generated by the floating of the liquid level of the heat transfer liquid pool.

In the spray flow control method of a nuclear power plant containment cooling system, wherein the spraying device includes a spraying valve; the adjustment mechanism includes a connecting-rod transmission mechanism connected to the spraying valve and a buoyancy supporting element; wherein the step S2 further includes the following steps:

S2-1, when an evaporating amount of the cooling liquid is larger than the flow at the liquid outlet, the buoyancy supporting element moves downwardly, driving the connecting-rod transmission mechanism to move downwardly, the opening degree of the spraying valve increases, and the flow at the liquid outlet increases;

S2-2, when the evaporating amount of the cooling liquid is less than the flow at the liquid outlet, the buoyancy supporting element moves upwardly, driving the connecting-rod transmission mechanism to move upwardly, the opening degree of the spraying valve decreases, and the flow at the liquid outlet decreases.

In the spray flow control method of a nuclear power plant containment cooling system, wherein the nuclear power plant containment cooling system further includes a shielding shell; an air inlet is defined on a side wall of the shielding shell; a position of the air inlet is higher than a highest freely floating position of the buoyancy supporting element; wherein the method further includes the following steps:

S3, introducing air into the nuclear power plant containment cooling system via the air inlet in order to receive the heat of the cooling liquid in the heat transfer liquid pool, and to facilitate the evaporated steam to move upwardly.

In the spray flow control method of a nuclear power plant containment cooling system, wherein in the step S3, a thermal insulation baffle is vertically arranged in the heat transfer liquid pool; the thermal insulation baffle is used for dividing the heat transfer liquid pool into an inner corridor which is close to the containment and an outer corridor which is away from the containment.

In the spray flow control method of a nuclear power plant containment cooling system, wherein a heat cycling space for heat exchange is formed between the inner corridor and the outer corridor; the inner corridor in contact with the outer wall of the containment receives the heat conducted out of the wall of the containment; the air flows into an upper portion of the heat transfer liquid pool via the air inlet, the air receives the heat from hot flow on an upper surface of the heat transfer liquid pool, mixes with the steam respectively evaporated from the heat transfer liquid pool and from the outer wall of the containment, and flows upwardly along a circulating space formed between the shielding shell and the containment.

In the spray flow control method of a nuclear power plant containment cooling system, wherein an air outlet is further defined at a top of the shielding shell; the air obtained in step S3 and the steam evaporated from the heat transfer liquid pool and from the outer wall of the containment flow out of the nuclear power plant containment cooling system via the air outlet.

When implementing the nuclear power plant containment cooling system and a spray flow control method therefor of the present application, the following advantageous can be achieved: by arranging a heat transfer liquid pool on the outside of the containment, the cooling liquid sprayed from the upper portion of the containment is stored; the opening degree of the spraying valve is automatically adjusted according to the rising and dropping of the liquid level of the heat transfer liquid pool, and the spray flow is in turn controlled. The cooling liquid which is not evaporated further flows downwardly into the heat transfer liquid pool, and is heated and evaporated in the heat transfer liquid pool. In this way, the cooling liquid still has the cooling function. Therefore, all the cooling liquid of the present application has its utilization maximized, and the volume of the cooling system liquid tank is obviously small. Furthermore, the present application only relies on the mechanical devices which do not need electrical controls, such as the buoyancy supporting element, the connecting rod devices, and the like, to automatically control the spray flow, without needing any sensors and corresponding temperature monitoring device which need power supply. In this way, the hardware structure is simplified, the cost is reduce, and the safety is also improved compared with the prior art.

BRIEF DESCRIPTION OF THE DRAWINGS

The present application will be further described with reference to the accompanying drawings and embodiments in the following, in the accompanying drawings.

LABEL LIST

1. Containment
2. Cooling system liquid tank
3. Heat transfer liquid pool
4. Spraying device
5. Spraying valve
6. Spraying pipeline
7. Buoyancy supporting element
8. Shielding shell
9. Thermal insulation baffle
10. Air inlet
11. Air outlet
12. Connecting-rod transmission mechanism
13. Cooling liquid dispersion device
14. Circulating space
15. Fastener
16. Positioning element
17. Transmission connecting rod
18. Annular deversoir
19. Spraying opening
20. Steam generator
21. Pressurizer
22. Core makeup tank
23. In-containment refueling water storage tank
24. Reactor core
25. Accumulator
50. Actuation valve

DETAILED DESCRIPTION OF THE PREFERRED EMBODIMENT

In order to make the objective, the technical solution and the advantages of the present application more clearly, the present application will be further described in detail with reference to the accompanying drawings and embodiments. It should be understood that, the specific embodiments described herein is only for explanation, and not for limitation.

Aiming at the defects in the prior art that the containment cooling system has a low safety, a complicated structure and is not conducive to the promotion thereof, the present application designs a passive containment cooling system and method utilizing buoyancy to automatically adjust the spray flow. The system and spray flow control method of the present application can maximize the utilization of the cooling liquid. The containment cooling system and spray flow control method therefor of the present application can adjust the spray flow of the cooling liquid in time without any external power (such as electric power and the like) due to the automatic adjustment of the buoyancy, in such a way that waste heat of the reactor in the containment can be removed, the damage caused by high pressure in the containment can be effectively prevented, and the safety of the containment cooling system can be effectively improved.

Figure 1:
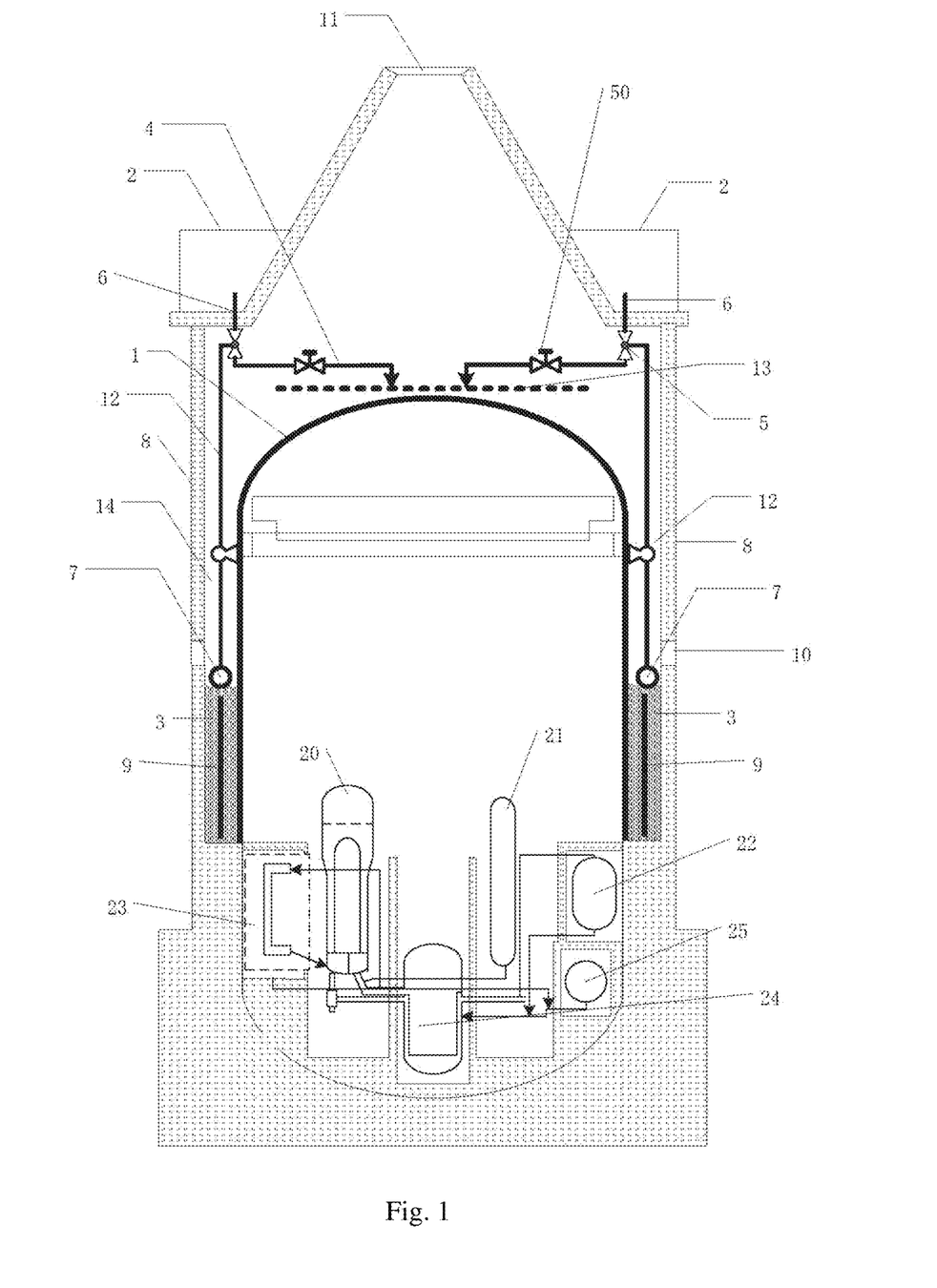
FIG. 1 is a schematic view of a nuclear power plant containment cooling system provided in a preferred embodiment of the present application.

FIG. 1 is a schematic view of a nuclear power plant containment cooling system provided in a preferred embodiment of the present application. As shown in FIG. 1, in the nuclear power plant containment cooling system of the present embodiment, the containment 1 is used for coating a reactor system. The reactor system in the containment 1 comprises a steam generator 20, a pressurizer 21, a core makeup tank 22, an in-containment refueling water storage tank 23, a reactor core 24, an accumulator 25, and the like.

The structures and functional relationships of all parts of the reactor system belong to the prior art, and will not be described in detail herein. For the convenience of arrangement of an adjustment mechanism, a cooling system liquid tank 2 is arranged externally above the containment 1. Cooling liquid, such as water, is stored in the cooling system liquid tank 2. A liquid outlet is defined at a bottom of the cooling system liquid tank 2. The cooling liquid flows out of the cooling system liquid tank via the liquid outlet due to the gravity, reaches to the containment 1 and further forms liquid film coating the outside of the containment 1 on the surface of the containment 1. Heat generated from the reactor in the containment 1 is conducted out when the liquid film is heated and evaporated, and thus the containment 1 is cooled.

In order to achieve a passive automatic adjustment of the flow at the liquid outlet of the cooling system liquid tank 2, a heat transfer liquid pool 3 is further provided outside the bottom of the containment 1. An adjustment mechanism used for adjusting the flow at the liquid outlet of the cooling system liquid tank 2 utilizing the buoyancy is further mounted between the heat transfer liquid pool 3 and the cooling system liquid tank 2. One end of the adjustment mechanism is suspended above a liquid level of the heat transfer liquid pool 3, and the other end of the adjustment mechanism is connected to the aforesaid liquid outlet. In this embodiment, one end of the adjustment mechanism that is close to the heat transfer liquid pool 3 is a lower end, while the other end of the adjustment mechanism that is connected to the liquid outlet is an upper end. The liquid film formed by the cooling liquid and covering the containment 1 further drops to the heat transfer liquid pool 3 due to the gravity when it is not evaporated in time, and the liquid film is further stored in the heat transfer liquid pool 3. When a heat transfer demand of the containment 1 is relative small, the liquid film on the outside of the containment 1 and the cooling liquid inside the heat transfer liquid pool 3 are evaporated slowly, and the liquid level of the heat transfer liquid pool 3 rises along with the continuous dropping of the cooling liquid. Once the liquid level of the heat transfer liquid pool 3 rises to contact with one end of the adjustment mechanism suspended above the liquid level, buoyancy generated due to the continuously rising of the liquid level will be applied to the adjustment mechanism, and the lower end of the adjustment mechanism that is in contact with the liquid level of the heat transfer liquid pool 3 moves upwardly due to the buoyancy, driving the upper end of the adjustment mechanism that is close to the liquid outlet to control the flow of the liquid outlet, thereby reducing the flow of the liquid outlet, and the cooling liquid is economically used. When the reactor inside the containment 1 generates a lot of heat, the heat transfer demand of the containment 1 is increased, the liquid film on the outside of the containment 1 and the cooling liquid inside the heat transfer liquid pool 3 are evaporated fast, and thus the liquid level of the heat transfer liquid pool 3 drops, making the lower end of the adjustment mechanism that is in contact with the heat transfer liquid pool 3 drops along with the dropping of the liquid level, and the upper end of the adjustment mechanism that is close to the liquid outlet is in turn driven to control the flow of the liquid outlet, and thus the flow of the liquid outlet is increased.

In order to ensure that the liquid film evenly covered the containment 1 is formed during the cooling process, and a spraying device 4 is further arranged at a top of the containment 1. In this case, the cooling system liquid tank 2 is in annular-shaped, and the liquid outlet at the bottom of the cooling system liquid tank 2 is communicated with the spraying device 4. A spraying valve 5 is further mounted between the spraying device 4 and the liquid outlet. By adjusting an opening degree of the spraying valve 5, the spray flow of the cooling liquid which is sprayed on the outside of the containment 1 by the spraying device 4 can be adjusted. The spraying valve 5 is associated with the adjustment mechanism. When the adjustment mechanism rises along with the rising of the liquid level of the heat transfer liquid pool 3, the opening degree of the spraying valve 5 is decreased, and the flow at the liquid outlet is decreased as a result. However, when the adjustment mechanism drops along with the dropping of the liquid level of the heat transfer liquid pool 3, the opening degree of the spraying valve 5 is increased, and the flow of the liquid outlet is increased as a result.

The nuclear power plant containment cooling system provided in a preferred embodiment of the present application can be used as a part of the pressurized water reactor nuclear power plant passive safety system. In this case, the containment 1 is preferably a steel containment. As shown in FIG. 1, the heat transfer liquid pool 3 is provided outside the bottom of the containment 1. The cooling liquid sprayed by the spraying device 4 from the top of the containment 1 forms the liquid film on an outer wall of the containment 1 and further flows downwardly, and the cooling liquid is further evaporated due to high temperature of the outer wall of the containment 1. Due to the gravity, the cooling liquid which is not evaporated drops, and further enters the heat transfer liquid pool 3.

Figure 2:
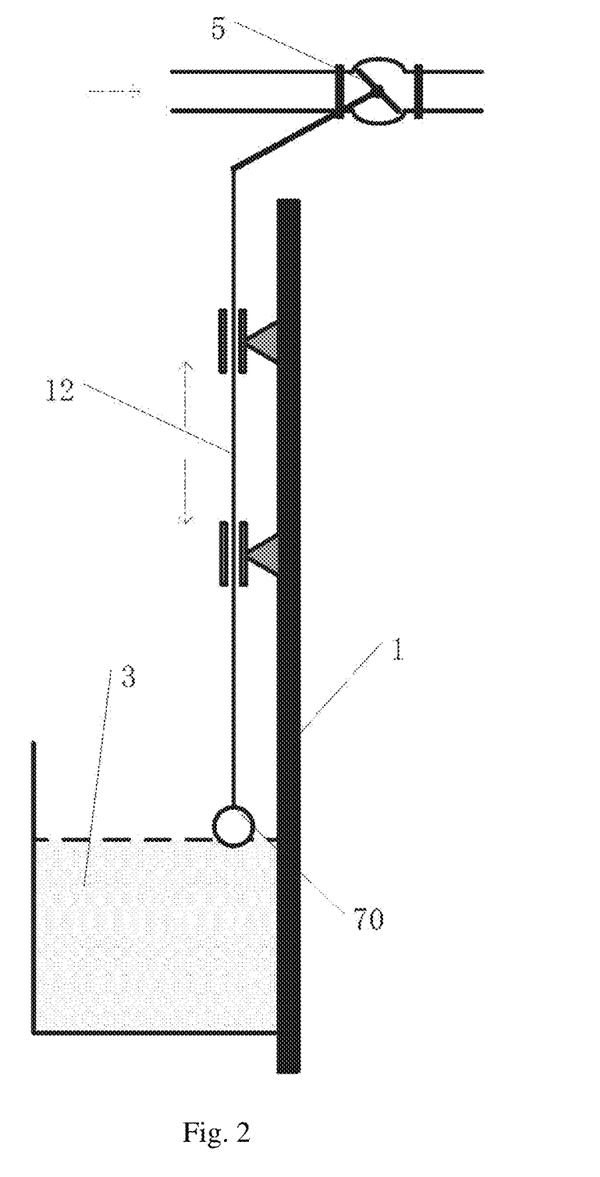
FIG. 2 is view showing a spray flow control method of the nuclear power plant containment cooling system provided in the preferred embodiment of the present application.

As shown in FIG. 1 and FIG. 2, the adjustment mechanism of the present application includes a connecting-rod transmission mechanism 12 connected to the spraying device 4 and a buoyancy supporting element 7 connected to one end of the connecting-rod transmission mechanism 12 that is close to the heat transfer liquid pool 3. The connecting-rod transmission mechanism 12 includes a transmission connecting rod 17. The buoyancy supporting element 7 is connected to one end of the transmission connecting rod 17 that is close to the heat transfer liquid pool 3, and the other end of the transmission connecting rod 17 is connected to the spraying valve 5. In a state shown in FIG. 1, the buoyancy supporting element 7 is in contact with the liquid level of the heat transfer liquid pool 3. A fastener 15 is arranged on the outside of the containment 1, and the transmission connecting rod 17 runs through the fastener 15 in such a way that when the liquid level of the heat transfer liquid pool 3 rises or drops, the transmission connecting rod 17 will only move in the vertical direction, and will remain stationary to a certain degree in the horizontal direction.

The spraying device 4 provided in the present application includes a spraying pipeline 6 for guiding the cooling liquid out of the cooling system liquid tank 2, and a cooling liquid dispersion device 13 communicated with the spraying pipeline 6. The spraying valve 5 and an actuation valve 50 are further mounted on the spraying pipeline 6. The spraying valve 5 is connected to the transmission connecting rod 17. The transmission connecting rod 17 exerts a force on the spraying valve 5 when moving along with the buoyancy supporting element 7, and thus the opening degree of the spraying valve 5 is influenced. The actuation valve 50 is actuated automatically when the cooling system of the present application is initiated, and the actuation valve 50 is used for controlling the communication between the spraying pipeline 6 and the cooling liquid dispersion device 13. As shown in FIG. 1, the cooling liquid dispersion device 13 communicated with the spraying pipeline 6 is arranged above the dome of the containment 1. After the cooling liquid flows into the cooling liquid dispersion device 13 via the spraying pipeline 6, the cooling liquid is further sprayed evenly on the outer wall of the arc dome of the containment 1, and thus the cooling liquid can be evenly dispersed radially and circumferentially on the outer wall of the arc dome of the containment 1, and thus cooling liquid film which covers the containment 1 is formed, and the whole containment 1 can be cooled evenly.

As shown in FIG. 2, the spraying valve 5 of the present embodiment is a self-operated regulating valve. A valve rod (not shown) of the self-operated regulating valve is connected to the transmission connecting rod 17. The transmission connecting rod 17 drives the valve rod of the self-operated regulating valve to rotate, and in turns control the flow of the cooling liquid inside the spraying pipeline 6. Since the movement of the transmission connecting rod 17 is controlled by the variation of position of the buoyancy supporting element 7, and the position of buoyancy supporting element 7 in the vertical direction will be changed along with the rising and dropping of the liquid level once the buoyancy supporting element 7 is in contact with the liquid level of the heat transfer liquid pool 3, the system of the present application can open the spraying valve 5 and control the opening degree of the spraying valve according to the liquid level of the heat transfer liquid pool 3. The cooling liquid sprayed by the cooling liquid dispersion device 13 drops into the heat transfer liquid pool 3, and thus it is possible to achieve a water supplement for the heat transfer liquid pool 3, and the liquid level of the heat transfer liquid pool 3 can be kept stable. The present application provides a feedback containment cooling system which controls the spray flow by the variation of the height of the liquid level of the heat transfer liquid pool 3, and the cooling liquid which is sprayed out will weaken the amplitude of variation of the liquid level of the heat transfer liquid pool 3. Furthermore, the feedback adjusting mode of the present application utilizes a configuration combing the buoyancy supporting element 7 with the transmission connecting rod 17 to control the spray flow, as a result of which the passive cooling effect can be actually achieved. Furthermore, the cooling controlling effect thereof is timely; once the buoyancy supporting element 7 drops due to the dropping of the liquid level of the heat transfer liquid pool 3, the transmission connecting rod 17 then immediately controls the self-operated regulating valve to increase the spraying flow, which in turns accelerates the cooling of the containment 1. Obviously, the cooling system of the present application has advantages including having a simple structure, an in-time feedback and a high cooling efficiency.

A shielding shell 8 is further sleeved on a periphery of the containment 1 and a periphery of the heat transfer liquid pool 3, and the shielding shell 8 is preferably a concrete shielding shell. The shielding shell 8 is not only used for shielding off radioactivity, but also for supporting the cooling system liquid tank 2. After the cooling liquid forms the liquid film on the outside of the containment 1, the cooling liquid is further evaporated to form steam due to the heat generated by the reactor inside the containment 1. In order to relieve the pressure of the containment 1 caused by the steam continuously accumulated, an air outlet 11 is further defined at a top of the shielding shell 8. The evaporated steam rises to the air outlet 11, flows out of the air outlet 11 and further into the external atmosphere. In order to enhance the heat transfer efficiency of the containment cooling system of the present embodiment, an air inlet 10 is further defined on a side wall of the shielding shell 8 of the present embodiment. As shown in FIG. 1, a level of a bottom of the air inlet 10 is higher than a highest freely floating level of the buoyancy supporting element 7, and a circulating space 14 allowing the air to circulate is formed between the shielding shell 8 and the containment 1. The air flows into the circulating space 14 via the air inlet 10, mixes with the steam evaporated from the heat transfer liquid pool 3, flows upwardly along the circulating space 14 together with the steam, and further mixes with the steam evaporated from the outer wall of the containment 1 during the flowing, and is finally discharged via the air outlet 11. In this case, a hole is defined on the side wall of the shielding shell 8 in order to form the air inlet 10; the hole is used as an inlet allowing the air to enter the circulating space 14 between the shielding shell 8 and the containment 1, and is also used as an overflow hole for preventing the storage level of the heat transfer liquid pool 3 from being too high to apply high pressure to the containment 1.

In order to enhance the heat transfer ability of the heat transfer liquid pool 3, in the passive nuclear power plant containment cooling system of the present embodiment, a thermal insulation baffle 9 is further vertically arranged in the heat transfer liquid pool 3. The thermal insulation baffle 9 divides the heat transfer liquid pool 3 into an inner corridor and an outer corridor. In this case, the inner corridor is close to the outer wall of the containment 1, while the outer corridor is close to the inner wall of the shielding shell 8. In the inner corridor, the cooling liquid in the heat transfer liquid pool 3 receives the heat conducted out of the containment, and is heated up, which makes the density of the cooling liquid in the inner corridor lower than the density of the cooling liquid in the outer corridor. In this way, the cooling liquid is driven to flow upwardly due to the density difference, and is further in contact with the air on an upper surface of the heat transfer liquid pool 3. The high-temperature water is evaporated thereon and heat transfer is in turns carried out. In this way, the heat is transferred to the air, and the liquid is cooled. The cooled liquid enters the outer corridor again, and further flows downwardly, and thus a natural circulation is formed between the inner corridor and the outer corridor. In this case, the thermal insulation baffle 9 is used for ensuring that the inner corridor and outer corridor are of a certain temperature, so as to enhance the natural circulation effect. It should be understood that, a height of the thermal insulation baffle 9, positions of two ends of the thermal insulation baffle 9 and sizes of the corresponding inner corridor and outer corridor may be changed as required.

In the passive nuclear power plant containment cooling system of the present embodiment, a height of the highest level of the heat transfer liquid pool 3 is lower than the bottom of the air inlet 10. An initial liquid level of the heat transfer liquid pool 3 should not be too high, since it will result in a high-pressure load on the steel containment shell if the liquid level of the heat transfer liquid pool 3 is too high. Preferably, the liquid level has a height of 5-20 m. Therefore, in this embodiment, the initial liquid level of the heat transfer liquid pool 3 is preliminarily designed as having a height of 10 m. The thermal insulation baffle 9 is used for insulating the heat of the flow in the inner corridor from the heat of flow in the outer corridor in the heat transfer liquid pool, thereby enhancing the natural circulation effect. Air enters from the air inlet 10, receives the heat transferred from the high-temperature water in the heat transfer liquid pool 3, mixes with the steam evaporated from the heat transfer liquid pool 3 and from the containment 1, and then flows upwardly, and is finally discharged from the air outlet 11 at the top of the containment 1.

It should be understood that, before the liquid level of the heat transfer liquid pool 3 of the present application is in contact with the buoyancy supporting element 7, the buoyancy supporting element 7 controls the spraying valve 5 to spray in form of a maximum opening degree in which the valve is fully opened. That is, after an accident occurs in the nuclear plant, and in an initial period of time after the containment cooling system is initiated, the liquid level of the heat transfer liquid pool 3 is not in contact with the buoyancy supporting element 7, and thus the spraying valve 5 can provide a full-flow spraying. Since the temperature and pressure in the containment usually reach to their peaks in the initial period of time after the accident occurs, therefore, the full-flow spraying in the initial period of time after the accident occurs may reduce the temperature and pressure peak. The liquid level rises and is finally in contact with the buoyancy supporting element 7. After that, the opening degree of the spraying valve 5 is adjusted by the up-down floating of buoyancy supporting element 7.

In a preferred embodiment of the present application, the buoyancy supporting element 7 in FIG. 1 is preferably a floater. It should be understood that, the shape of the buoyancy supporting element in the present application is not limited to a sphere, and the buoyancy supporting element may be in any other shapes. Referring to FIG. 2, the buoyancy supporting element 7 is arranged in the heat transfer liquid pool 3, and the buoyancy supporting element 7 floats along with the rising and dropping of the liquid level of the heat transfer liquid pool 3. The buoyancy supporting element 7 is connected to the valve rod (not shown here) of the self-operated regulating valve 5 via the connecting-rod transmission mechanism 12, and the floating of the buoyancy supporting element 7 drives the valve rod to control the opening degree of the self-operated regulating valve 5. When the liquid level of the heat transfer liquid pool 3 rises, the buoyancy supporting element 7 floats upwardly; in this way, the opening degree of the self-operated regulating valve 5 decreases with the transmission of the connecting-rod transmission mechanism 12, and the spraying flow of the spraying pipeline 6 also decreases. However, when the liquid level of the heat transfer liquid pool 3 drops, the buoyancy supporting element 7 drops, driving the connecting-rod transmission mechanism 12 moves downwardly, and then the opening degree of the self-operated regulating valve 5 increases, and the spraying flow of the spraying pipeline 6 also increases. In this way, the liquid level of the heat transfer liquid pool 3 is maintained substantially stable. If the containment 1 is at high temperature, that is, more heat needs to be discharged, then the evaporating rate of the liquid in the heat transfer liquid pool 3 is very fast, and the liquid level of the heat transfer liquid pool 3 drops greatly; the opening degree of the self-operated regulating valve 5 increases, and the spraying flow also increases, until the evaporated amount of the cooling liquid in the heat transfer liquid pool 3 is comparable to the flow at the liquid outlet of the cooling system liquid tank 2, and the liquid level of the heat transfer liquid pool 3 reaches the equilibrium. On the contrary, if less heat needs to be discharged, then the evaporating rate of the liquid in the heat transfer liquid pool 3 is slow, and the liquid level of the heat transfer liquid pool 3 drops slightly; the opening degree of the self-operated regulating valve 5 decreases, and the spraying flow also decreases, until the liquid level of the heat transfer liquid pool 3 reaches the equilibrium. In this embodiment, the individual buoyancy supporting elements 7 correspond to the individual spraying valves 5. In the embodiment as shown in FIG. 1, two buoyancy supporting elements 7 are symmetrically arranged on two sides of the containment 1, and are respectively connected to the corresponding spraying valves 5 via the connecting-rod transmission mechanisms 12 symmetrically arranged. It should be understood that, it is possible to arrange one buoyancy supporting element or a plurality of buoyancy supporting elements 7 in the present application. The plurality of buoyancy supporting elements are evenly distributed on the outside of the containment 1, and each of the buoyancy supporting elements 7 corresponds to one spraying valve 5.

Figure 3:
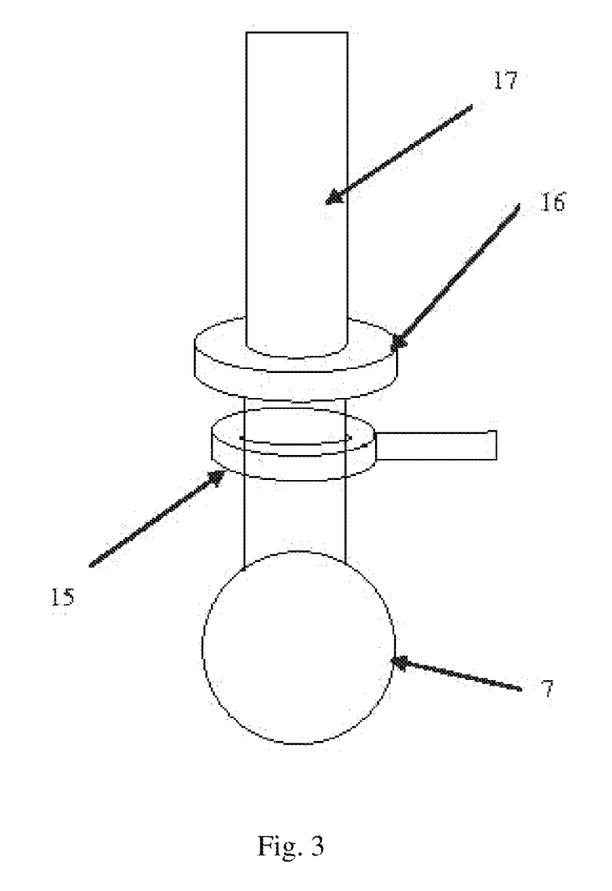
FIG. 3 is a schematic view of a buoyancy supporting element of a nuclear power plant passive containment cooling system provided in the preferred embodiment of the present application.

As shown in FIG. 3, the buoyancy supporting element 7 is fixed at an end of the connecting-rod transmission mechanism 12, and a fastener 15 extends from a side face of the containment 1. The fastener 15 in this embodiment is substantially in shape of an annulus, and the connecting-rod transmission mechanism 12 runs through the fastener 15 and the buoyancy supporting element 7 is relatively fixed. In order to ensure that the buoyancy supporting element 7 can flow up and down along with the rising and dropping of the liquid level of the heat transfer liquid pool 3, an inner diameter of the fastener 15 is larger than a diameter of the connecting-rod transmission mechanism 12. Meanwhile, in order to limit the initial position of the buoyancy supporting element 7, a positioning element 16 is further arranged on an outer side wall of the connecting-rod transmission mechanism 12. The positioning element 16 in this embodiment is in shape of an annulus and coated on a periphery of the connecting-rod transmission mechanism 12, in such a way that the buoyancy supporting element 7 will not further move downwardly along with the dropping of the liquid level of the heat transfer liquid pool 3 when the buoyancy supporting element 7 is at an initial position.

In an initial period of the accident condition of the nuclear plant, the temperature and pressure inside the containment 1 reach to their peaks, and the cooling liquid is needed most. The system of the present embodiment carries out a full-flow spraying in an initial period of time after the accident occurs in the nuclear plant, in order to achieve the best cooling effect. The duration time can be pre-controlled by setting the initial liquid level of the heat transfer liquid pool 3. Then it turns to a later cooling stage in which the flow is automatically controlled. Normally, the heat transfer liquid pool 3 has a certain amount of liquid stored therein, and the liquid level of the heat transfer liquid pool 3 is of a certain height, but the liquid level is not high enough to be in contact with the buoyancy supporting element 7, and the self-operated regulating valve is fully opened. Once an accident occurs in the nuclear plant, the actuation valve 50 on the spraying pipeline 6 is opened, and a full-flow spraying is continuously carried out for the spraying pipeline 6, until the liquid level of the heat transfer liquid pool 3 rises to be in contact with the buoyancy supporting element 7, and the buoyancy supporting element 7 gradually floats upwardly to make the spraying flow decreased. Therefore, a distance between the initial position of the liquid level of the heat transfer liquid pool 3 and the buoyancy supporting element can determine the duration time of the full-flow spraying. And the duration time can be set according to the specific conditions of the power plant (such as the power of the reactor, the appeared time of the temperature and pressure peaks in the containment).

In the present embodiment, the steel containment shell is a steel plate having a thickness of approximately 4.5 cm, which can meet the functional requirements of suppressing pressure and containing radioactive substance in the passive nuclear power plant.

The cooling liquid is conveyed to the cooling liquid dispersion device 13 via the spraying device 4 at the top of the containment 1, and is further sprayed to the arc dome of the containment 1 via the cooling liquid dispersion device 13.

Figure 4:
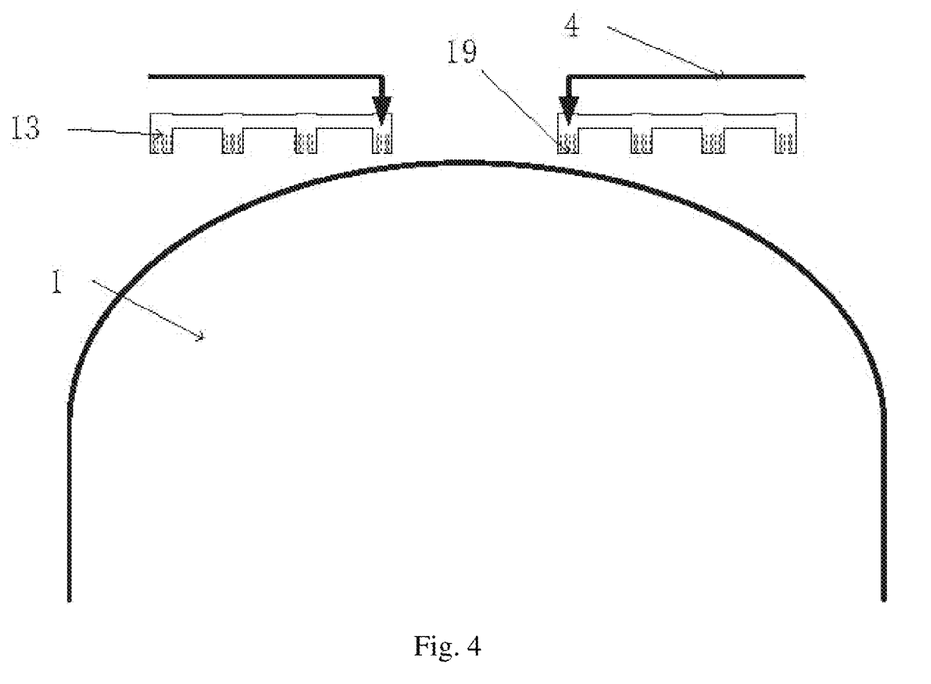
FIG. 4 is a side view of a cooling liquid dispersion device of the nuclear power plant passive containment cooling system provided in the preferred embodiment of the present application.

Referring to FIG. 4, the cooling liquid dispersion device 13 is fixedly mounted above the containment 1, and the cooling liquid is evenly sprayed to the arc dome of the containment 1 after being dispersed by the cooling liquid dispersion device 13. Referring to FIG. 4, the cooling liquid dispersion device 13 in the present embodiment is communicated with the spraying device 4, and spraying openings 19 are evenly defined on the cooling liquid dispersion device 13. The cooling liquid is downwardly sprayed to the arc dome of the containment 1 via the spraying openings 19, and further flows downwardly to fully and evenly cool the containment 1.

Figure 5:
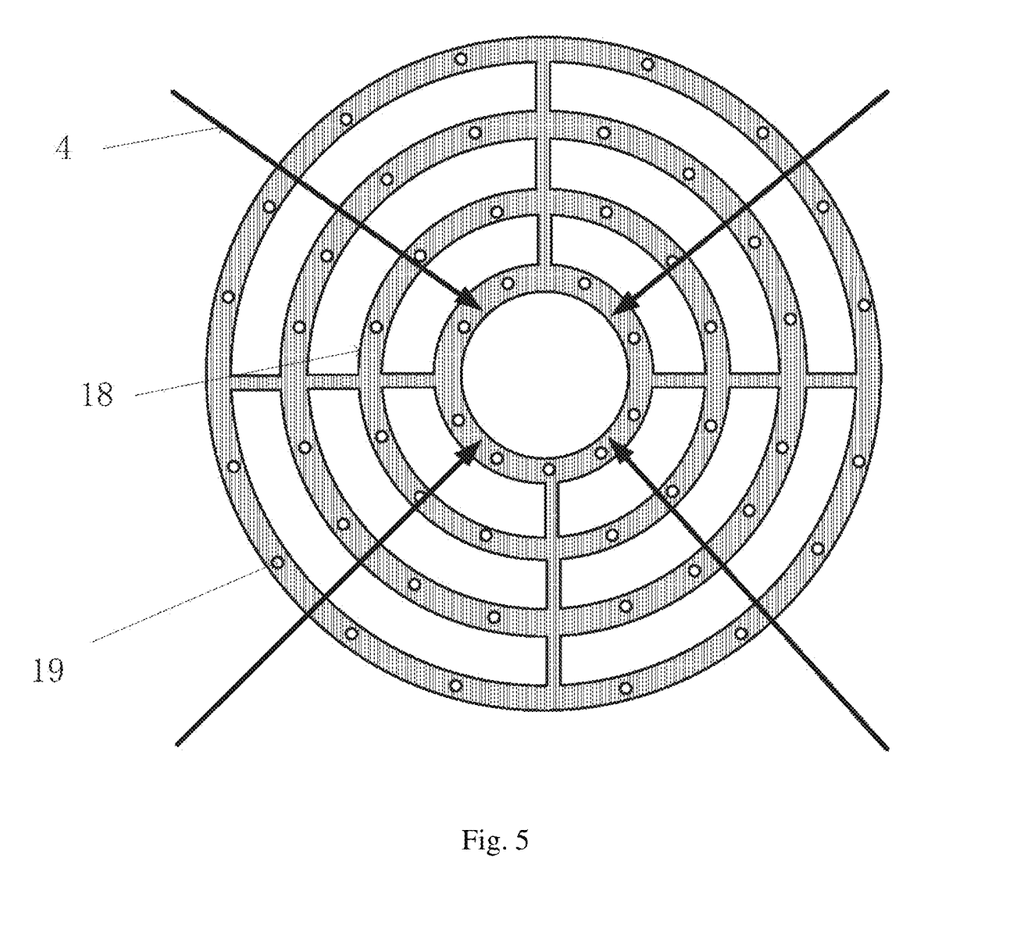
FIG. 5 is a top view of the cooling liquid dispersion device shown in FIG. 4.

FIG. 5 further described a specific structure of the cooling liquid dispersion device 13. The cooling liquid dispersion device 13 in this embodiment is an annular deversoir 18 which includes a plurality of annular channels. Diameters of respectively annular channels are decreased gradually, and the annular channels are communicated with each other. Spraying openings 19 are evenly defined on a surface of each of the annular channels that faces towards the containment 1. The cooling liquid flows into the annular deversoir 18, dispersed evenly to the annular channels, and is evenly sprayed to the arc dome of the containment 1 via the spraying openings 19 to form liquid film covering the containment 1.

The passive nuclear power plant containment cooling system of the present application has a relative high safety and reliability, since the cooling system liquid tank 2 at the top of the containment of the present application has a much more smaller volume compared with those in the prior art, thereby reducing the threat of the extreme natural disasters to the safety of the cooling system liquid tank. In additional to the liquid film convection and air convection, the present application further adds a new effective heat transfer methods—heat transfer liquid pool convection. In this way, the heat transfer efficiency is improved, which helps to suppress the pressure peak of the containment after an accident is occurred in the nuclear power plant. The whole system mainly relays on the pool type heat transfer in the heat transfer liquid pool 3, and the liquid film convection is only an assistant method, which is equivalent to transfer a large part of hot trap from the top of the containment to the ground. In this way, the spraying flow can be greatly reduced, and thus the volume of the cooling system liquid tank 2 can be greatly reduced. By means of the buoyancy supporting element 7 and the connecting-rod transmission mechanism 12 and the like, the spraying device 4 adjusts the spraying flow automatically, and the sprayed cooling liquid which is not evaporated enters the heat transfer liquid pool 3, and is heat transferred and evaporated therein. In this way, the utilization of the cooling liquid is maximized, which means all of the cooling liquid is completely evaporated.

The passive nuclear power plant containment cooling system does not work during the normal operation condition of the nuclear power plant, and is automatically put into use in necessary only after an accident occurs in the nuclear power plant.

Under the normal operation condition of the nuclear power plant, the heat transfer liquid pool 3 has a certain initial liquid level, and is maintenance regularly. When an accident occurs in the nuclear power plant, the circulation flow between the inner corridor and the outer corridor, the natural-convection heat transfer between the cooling liquid in the inner corridor and the outer wall of the steel containment is actuated by natural driver. That is, the natural circulation is driven by the density difference caused by the temperature difference between the flow in the inner corridor and the flow in the outer corridor, and the heat convection is driven by the temperature difference between the cooling liquid and the outer wall of the steel containment.

The main principle of the present application is the natural circulation principle which is widely used in the nuclear power plant passive design, and the reliability and safety thereof have been verified. The self-operated regulating valve used in the present application is widely used in the industry, and has sufficient service experience.

Storing liquid in the heat transfer liquid pool 3 will not cause any unacceptable pressure load to the containment shell. Take the existing AP1000 nuclear power plant containment cooling system as example (table 1), the failure probability of the containment under 81 psig pressure load in 24 hours is less than 0.01%. The storage level of the heat transfer liquid pool 3 has a height of 3 m, and thus the head pressure born by the steel containment at the bottom of the liquid pool is 14.22 psig, which is much less than the failure bearing pressure load of the steel containment. Furthermore, the present application takes various measures, such as using reinforcing ribs, thickening the wall, and the like, to enhance the load bearing ability of a part of the steel containment where the liquid pool is located.

TABLE 1

Failure possibility of the containment under the nominal condition and conservative condition in 24 hours and 72 hours

| | Pressure in 24 hours (MPa gage pressure/psig) | Failure possiblity in 24 hours | Pressure in 72 hours (MPa gage pressure/psig) | Failure possiblity in 72 hours |
|---|---|---|---|---|
| Nominal condition | 0.558/81 | <0.01%(1) | 0.724/105 | 2.2%(1) |
| Conservative cond | 0.689/100 | 2%(2) | 1.117/162 | 90.5%(2) |

The self-operated valve is widely used in the industry, and is a controlling device in which the automatic adjustment is carried out only by the pressure (or temperature) measuring valve and preset value, without any external power. The self-operated valve has the function of controlling and implementing at the same time. The types of self-operated regulating valve include the self-operated (pressure) flow control valve, the self-operated (pressure difference) flow control valve, and the self-operated (temperature) flow control valve. In the present application, the self-operated (pressure) flow control valve is used. However, other feasible self-operated regulating valves may also be used.

The present application further provides a spray flow control method of the passive nuclear power plant containment cooling system. To avoid repetition, the passive nuclear power plant containment cooling system is not further described here. The method includes the following steps:

S0, an initial liquid level of the heat transfer liquid pool 3 is preset before the cooling system is initiated, and a lower end of the adjustment mechanism is suspended above the initial liquid level of the heat transfer liquid pool 3. Before the adjustment mechanism is in contact with the heat transfer liquid pool 3, the adjustment mechanism is controlled by the gravity, and the flow at the liquid outlet of the cooling system liquid tank 2 keeps maximal. Therefore, the lower end of the adjustment mechanism which is close to the initial liquid level of the heat transfer liquid pool 3 defines the duration time of the maximum flow of the cooling system liquid tank 2.

S1, when the cooling system needs to be initiated under an accident condition, an operator manually initiates the cooling system one-time, or the system sends signals one-time according to the preset conditions to actuate and initiate the cooling system. The cooling liquid flows out of the cooling system liquid tank 2 in form of a maximal flow due to the gravity and cools the containment 1. The cooling liquid is in contact with the outer wall of the containment 1, heated thereon and further partially evaporated. Specifically, the cooling liquid flowing out of the liquid outlet of the cooling system liquid tank 2 forms the liquid film covering the containment 1 on the outside of the containment 1, and the cooling liquid which is not evaporated flows into the heat transfer liquid pool 3 along the outer wall of the containment 1. Before the liquid level of the heat transfer liquid pool 3 is in contact with the lower end of the adjustment mechanism, the adjustment mechanism controls the cooling liquid to flow out of the liquid outlet of the cooling system liquid tank 2 and further flow to the outer wall of the containment 1 in form of a maximal flow due to the gravity. Once the liquid level of the heat transfer liquid pool 3 rises to be in contact with the adjustment mechanism, the adjustment mechanism is applied with the buoyancy generated by the cooling liquid in the heat transfer liquid pool 3, and the adjustment mechanism controls the flow at the liquid outlet of the cooling system liquid tank 2 according to the buoyancy generated by the liquid level of the heat transfer liquid pool 3.

S2, after the liquid level of the heat transfer liquid pool 3 rises to be in contact with the lower end of the adjustment mechanism, the flow at the liquid outlet is controlled by the buoyancy generated by the floating of the liquid level of the heat transfer liquid pool 3. Further, the step S2 includes: when the cooling liquid continuously flows to the containment 1 in a maximal flow in Step S1, the cooling liquid which is not evaporated in time drops into the heat transfer liquid pool 3, causing a rising of the liquid level of the heat transfer liquid pool 3. Referring to the cooling system shown in FIG. 1, the opening degree of the spraying valve 5 at the liquid outlet of the cooling system liquid tank 2 is adjusted by the adjustment mechanism according to the buoyancy generated by the heat transfer liquid pool 3. Therefore, when the heat transfer amount is large, the cooling liquid in the heat transfer liquid pool 3 is heated and evaporated, making the evaporating amount of the cooling liquid larger than the flow at the liquid outlet, the liquid level of the heat transfer liquid pool 3 drops, and the buoyancy supporting element 7 moves downwardly, driving the connecting-rod transmission mechanism 12 to move downwardly; in this way, the opening degree of the spraying valve 5 increases, and the flow at the liquid outlet also increases. When the evaporating amount of the cooling liquid is less than the flow at the liquid outlet, the heat transfer amount of the containment 1 is low, the liquid level of the heat transfer liquid pool 3 rises, and the buoyancy supporting element 7 moves upwardly, driving the connecting-rod transmission mechanism 12 to move upwardly; in this way, the opening degree of the spraying valve 5 decreases, and the flow at the liquid outlet also decreases.

In additional, the spray flow control method of the nuclear power plant containment cooling system further includes the flowing step: S3, air is introduced into the nuclear power plant containment cooling system by natural circulation, via the air inlet 10 on the shielding shell 8 sleeved on the periphery of the containment 1, in order to receive the heat of the cooling liquid in the heat transfer liquid pool 3, and to facilitate the evaporated steam to move upwardly.

The heat transfer liquid pool 3 is received between the shielding shell 8 and the containment 1, and a thermal insulation baffle 9 is further vertically arranged in the heat transfer liquid pool 3. The thermal insulation baffle 9 divides the heat transfer liquid pool 3 into an inner corridor which is close to the containment 1 and an outer corridor which is close to the shielding shell 8. A heat cycling space is formed by the inner corridor and outer corridor. The inner corridor in contact with the outer wall of the containment 1 is used to receive the heat conducted out of the outer wall of the containment 1. The air flows into the upper portion of the heat transfer liquid pool 3 via the air inlet 10. After the air receives the heat of the hot flow on the upper surface of the heat transfer liquid pool 3, the air further mixes with the steam evaporated from the heat transfer liquid pool 3 and the steam evaporated from the outer wall of the containment 1, and flow together upwardly along the circulating space 14 formed between the shielding shell 8 and the containment 1.

After Step S3, the mixed air flows into the external atmosphere via the air outlet 11 at the top of the shielding shell, and bringing the heat of the containment 1 away from the cooling system, and thus the containment 1 is cooled.

In conclusion, compared with the existing cooling system and the control method therefor, the cooling system and the spray flow control method therefor of the present application have at least the following advantages:

1. It is a design solution based on the existing pressurized water reactor passive containment cooling system, and the passive containment cooling system does not need to be changed greatly. The volume of the cooling system liquid tank of the passive containment is greatly reduced, and the safety of the nuclear power plant containment is greatly improved. The system transfer heat to the external atmosphere relying on the buoyancy, gravity and heat circulation without being driven by power, and thus the problem of affecting the function of the system due to the failure of the driving mechanism does not exist, and the failure rate of the system is reduced.

2. After sprayed, the cooling liquid which is not evaporated enters the heat transfer liquid pool, and thus the utilization of the spraying liquid is maximized. Compared with the cooling method in which only the spraying is carried out, the cooling system of the present application adds a heat transfer liquid pool heat transfer method. Therefore, the heat transfer area of the outer wall of the steel containment is enhanced, and the heat transfer efficiency is greatly improved. The utilization of the cooling liquid and the heat transfer efficiency are improved, and the passive operating time of the passive nuclear power plant containment cooling system is greatly extended.

3. The present application can truly achieve the passive technology all the way without any external power (such as an alternating current power or a pump), and the variation of the flow does not need any manual operation. In additional, the method using the buoyancy supporting element 7, the connecting-rod transmission mechanism 12 and the spraying valve 5 to cooperate with each other to control the spray flow only uses mechanical structures without any electrical control. Compared with the existing method using the sensor to monitor and further control the spraying intensity, the configuration of the present application is greatly simplified, and thus the system and method is more widely used.

The embodiments of the present application are described with reference to the accompanying drawings. However, the present application is not limited to the embodiments above. In the inspiration of the present application, those skilled in the art may make many modifications or alternatives, without going beyond the purpose and the scope the claims intend to protect of the present application. All these belong to the protection of the present application.

The invention claimed is:

1. A nuclear power plant containment cooling system, comprising a cooling system liquid tank (2) for storing cooling liquid, wherein the cooling system liquid tank (2) is arranged at a top of a containment (1); the cooling liquid is used for cooling the containment (1) through the gravity of the cooling liquid in the situation of an accident, and the cooling liquid is partially evaporated;

the system further includes a heat transfer liquid pool (3) which is arranged at a bottom on an outside of the containment (1) and which is used for collecting the cooling liquid which is not evaporated;

the system further includes a spraying device (4) configured to form a liquid film covering the containment (1) by spraying the cooling liquid inside the cooling system liquid tank (2) through a liquid outlet of the cooling system liquid tank (2) onto the containment (1), wherein the spraying device is fluidly connected to the liquid outlet of the cooling system liquid tank (2); the spraying device (4) includes a spraying valve (5), wherein the spraying valve (5) is a self-operated regulating valve;

the spraying device (4) comprises a spraying pipeline (6) and a cooling liquid dispersion device (13), wherein the cooling liquid dispersion device (13) comprises a plurality of openings; one end of the spraying pipeline (6) is fluidly connected to the cooling liquid dispersion device (13); the other end of the spraying pipeline is fluidly connected to the cooling system liquid tank (2); the spraying valve (5) is mounted on the spraying pipeline (6); wherein the spraying valve (5) is configured to control the flow of the cooling liquid from the cooling system liquid tank (2), via the spraying pipeline (6) to the cooling liquid dispersion device (13), prior to the cooling liquid being dispersed on the outside of the containment (1) by the cooling liquid dispersion device (13);

the nuclear power plant containment cooling system further comprises an adjustment mechanism; wherein the adjustment mechanism is arranged at the liquid outlet of the cooling system liquid tank (2); the adjustment mechanism includes a connecting-rod transmission mechanism (12) and a buoyancy supporting element (7); the connecting-rod transmission mechanism (12) includes a transmission connecting rod (17) comprising two ends, wherein one end of the transmission connecting rod (17) is mechanically connected to the self-operated regulating valve, and the buoyancy supporting element (7) is fixedly arranged at the other end of the transmission connecting rod (17);

the transmission connecting rod (17) exerts a force on the spraying valve (5) when moving along with the buoyancy supporting element (7), and thus an opening degree of the spraying valve (5) is influenced;

a fastener (15) substantially in a shape of an annulus extends from a side face of the containment (1), and the connecting-rod transmission mechanism (12) runs through the fastener (15) to fix the buoyancy supporting element (7), an inner diameter of the fastener (15) is larger than a diameter of the connecting-rod transmission mechanism (12); and;

a positioning element (16) in a shape of an annulus is further coated on a periphery of the connecting-rod transmission mechanism (12).

2. The nuclear power plant containment cooling system according to claim 1, wherein the system further includes a shielding shell (8); the shielding shell (8) is disposed outside the containment (1), wherein the shielding shell (8) encloses the entire volume of the containment; the heat transfer liquid pool (3) for receiving the cooling liquid and a circulating space (14) for air circulation are housed inside the shielding shell (8).

3. The nuclear power plant containment cooling system according to claim 2, wherein a thermal insulation baffle (9) is vertically arranged in the heat transfer liquid pool (3); the thermal insulation baffle (9) is located below the buoyancy supporting element (7); the thermal insulation baffle (9) is used for dividing the heat transfer liquid pool (3) into an inner corridor which is close to the containment (1) and an outer corridor which is close to the shielding shell (8); the inner corridor and the outer corridor are fluidly connected with each other at a bottom of the thermal insulation baffle (9); a heat cycling space for heat transfer is formed between the inner corridor and the outer corridor.

4. The nuclear power plant containment cooling system according to claim 3, wherein an air inlet (10) is defined on a side wall of the shielding shell (8); a position of the air inlet (10) is higher than a highest freely floating position of the buoyancy supporting element (7); the air enters the heat cycling space, mixes with the air in the circulating space (14), and further flows upwardly along with the steam evaporated from the outer wall of the containment (1).

5. The nuclear power plant containment cooling system according to claim 4, wherein an air outlet (11) is further defined at a top of the shielding shell (8); the air inlet (10), the circulating space (14) and the air outlet (11) together form a steam circulating channel.

6. The nuclear power plant containment cooling system according to claim 1, wherein a plurality of adjustment mechanisms are provided; the plurality of adjustment mechanisms are evenly distributed on the outside of the containment (1); each of the adjustment mechanisms corresponds to one spraying valve (5).

7. The nuclear power plant containment cooling system according to claim 6, wherein the buoyancy supporting element (7) is a floater.

8. The nuclear power plant containment cooling system according to claim 3, wherein the thermal insulation baffle (9) is used for insulating the heat of the flow in the inner corridor from the heat of flow in the outer corridor in the heat transfer liquid pool (3).

* * * * *